(No Model.)
J. L. TALBOTT & C. J. HITER.
FRUIT GATHERER.
No. 287,977. Patented Nov. 6, 1883.
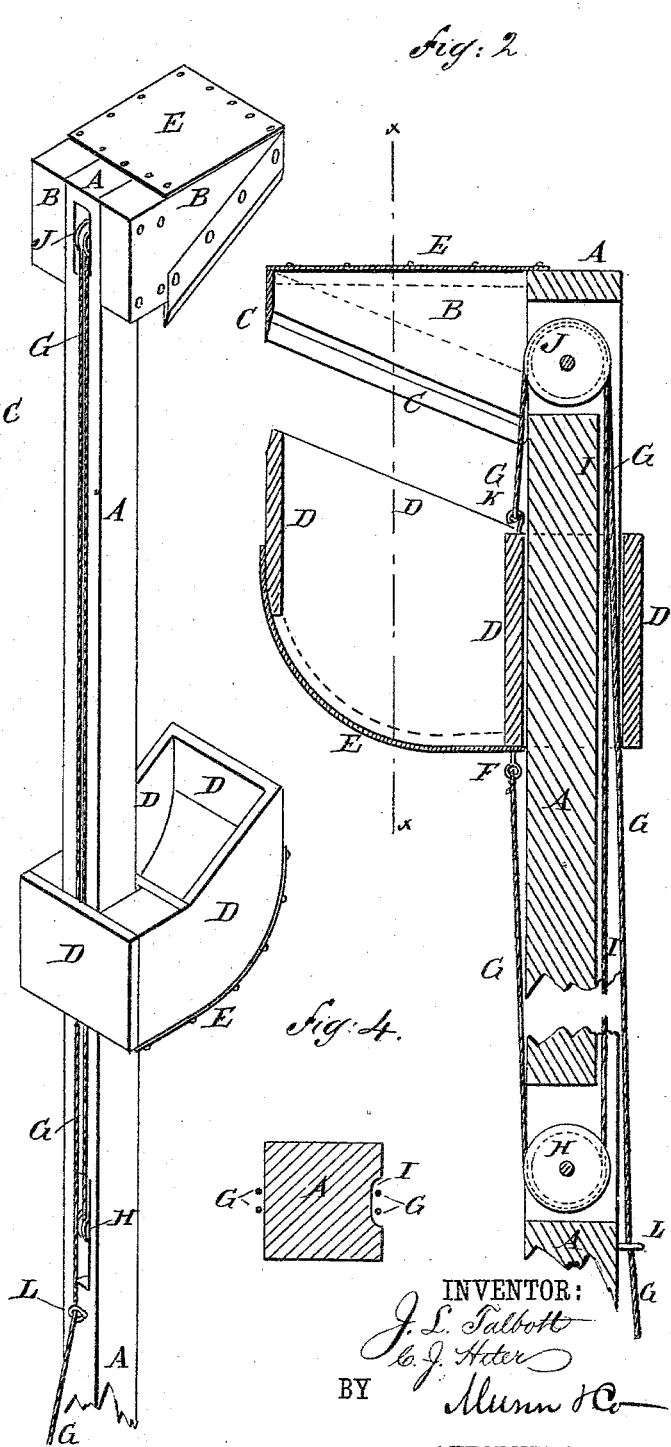
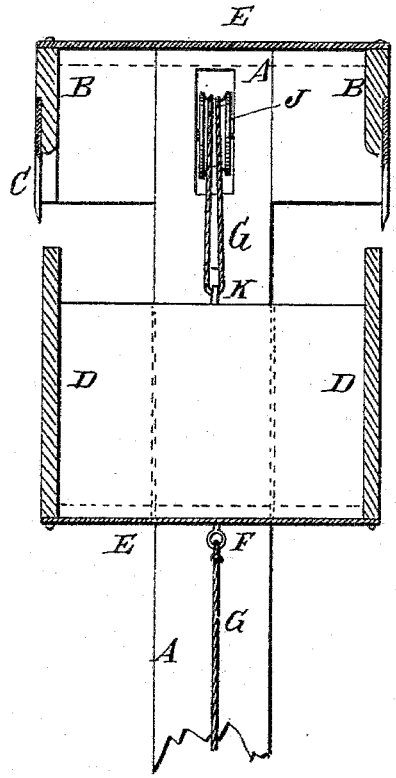
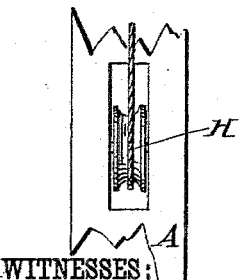
WITNESSES:
INVENTOR:
J. L. Talbott
C. J. Hiter
BY Munn & Co
ATTORNEYS.

United States Patent Office.

JESSE LEE TALBOTT AND CHESTERFIELD JAMES HITER, OF ELIZABETHTOWN, KENTUCKY.

FRUIT-GATHERER.

SPECIFICATION forming part of Letters Patent No. 287,977, dated November 6, 1883.

Application filed August 13, 1883. (No model.)

*To all whom it may concern:*

Be it known that we, JESSE LEE TALBOTT and CHESTERFIELD JAMES HITER, of Elizabethtown, in the county of Hardin and State of Kentucky, have invented a new and useful Improvement in Fruit-Gatherers, of which the following is a full, clear, and exact description.

Reference is to be had to the accompanying drawings, forming a part of this specification, in which similar letters of reference indicate corresponding parts in all the figures.

Figure 1 is a perspective view of our improvement, shown with the cup partly lowered. Fig. 2 is a sectional side elevation of the same, parts being broken away. Fig. 3 is a sectional front elevation of the same, taken through the line $x\ x$, Fig. 2. Fig. 4 is a cross-section of the pole and cord, taken above the cup.

The object of this invention is to facilitate the gathering of such fruits as may be beyond reach from ordinary ladders, and prevent the fruit from being bruised while being gathered.

The invention relates to a fruit-gatherer constructed with a pole having at its top a stationary frame provided with knives, and a cup sliding upon the said pole and raised and lowered by a cord connected with it, and passing around pulleys pivoted in slots in the upper and lower ends of the said pole, whereby the fruit can be gathered and lowered to the ground without being bruised, as will be hereinafter fully described.

A represents a square pole, of such dimension as will give it sufficient strength, and of any suitable length, reference being had to the height of the trees from which the fruit is to be gathered.

To the upper end of the pole A is attached a rectangular frame, B, of such a size as to readily receive within it the fruit to be gathered.

To the outer sides of the side and front edges of the frame B are attached knives C, the edges of which project below the said edges of the frame B.

If desired, the side edges of the frame B may be inclined, as shown in Figs. 1 and 2.

D is a frame to serve as a cup in gathering the fruit, and which has a socket in its rear part to receive and slide upon the pole A. The upper edges of the sides and front of the cup D are formed to correspond with the lower edges of the knife-holding frame B, so that the edges of the knives C will slide past the edges of the cup and clip off the stems of the fruit when the said cup and frame are brought together.

The bottom of the cup D and the top of the frame B are formed of canton-flannel, plush, or other suitable soft material, E, that will prevent the fruit from being bruised. For the same reason the frame B and cup D are designed to be lined with a similar material.

To the bottom of the cup D, at the front of the pole A, is attached a hook or eye-screw, F, to which is secured the end of a cord, G. The cord G is passed down to and around a pulley, H, pivoted in a slot in the lower part of the pole A, is passed up along a groove, I, in the rear side of the pole A, and through the socket in the cup D, is passed over a pulley, J, pivoted in a slot in the upper end of the pole A, and is passed to and through a hook or eye-screw, K, attached to the top of the cup D, at the front of the pole A. From the hook or eye-screw K the cord G is passed back over the pulley J, is passed down along the groove I, through the socket of the cup D, and through an eye-screw, L, attached to the back of the lower end of the pole A in such a position that the operator can readily grasp the free end of the said cord.

In using the implement the frame B is passed over the fruit to be gathered and the cup D is raised until the fruit is within it, the stem of the said fruit being between the edges of the said frame and cup. Then by a sharp jerk upon the cord G the stem of the fruit will be clipped off by the knife C and will be received in the said cup D. The cup D is then allowed to slide down the pole A by slackening the cord G, the fruit is removed from the said cup and placed in a basket, and the cup can be again raised and the operation repeated.

With this implement fruit that cannot be reached from an ordinary ladder can be gathered conveniently and without being bruised.

We do not abandon or dedicate to the public any patentable features set forth herein and not hereinafter claimed, but reserve the right to claim the same, either in a reissue of any patent that may be granted upon this application or in other applications for Letters Patent that we may make.

We are aware that it is not new to pull off fruit with a hook and use a sliding cup or basket on the pole to receive the fruit; but What we do claim as new and of our invention is—

In a fruit-picker, the combination, with the pole, of a frame, B, provided on opposite sides with downwardly-projecting knives C C, and slide-cup D, having upper edges over which said knives work to cut the stems, as described.

JESSE LEE TALBOTT.
CHESTERFIELD JAMES HITER.

Witnesses:
JAMES A. KINKEAD,
W. D. LANCASTER.